United States Patent

[11] 3,626,000

[72] Inventors Kazuo Tsunoi;
 Tadao Kato, both of Mishima-shi, Japan
[21] Appl. No. 695,895
[22] Filed Jan. 5, 1968
[45] Patented Dec. 7, 1971
[73] Assignee Toray Industries, Inc.
 Tokyo, Japan

[54] PROCESS FOR PREPARING BENZENE CARBOXYLIC ACIDS
 6 Claims, No Drawings
[52] U.S. Cl. ........................................ 260/524 R, 260/523 R
[51] Int. Cl. ........................................ C07c 51/24, C07c 63/02
[50] Field of Search ........................................ 260/524, 523

[56] References Cited
UNITED STATES PATENTS

| | | | |
|---|---|---|---|
| 1,694,122 | 12/1928 | Jaeger | 260/524 |
| 2,245,528 | 6/1941 | Loder | 260/524 |
| 2,959,613 | 11/1960 | Whitfield | 260/524 |
| 3,240,803 | 3/1966 | Thompson et al. | 260/524 |
| 3,284,493 | 11/1966 | Chibnik | 260/524 |

Primary Examiner—Lewis Gotts
Assistant Examiner—R. S. Weissberg
Attorney—Sherman and Shalloway ABSTRACT: In a process for preparing a benzene carboxylic acid by oxidizing a benzene derivative having at least one side-chain alkyl group with a molecular oxygen-containing gas in a lower aliphatic carboxylic acid solvent, an improvement which comprises using (A) a cobalt compound and (B) a substance selected from the group consisting of metallic silver and a silver compound, as catalysts, using (C) a substance selected from the group consisting of aldehydes, ketones, alcohols and paraldehyde, as a promoter.

PROCESS FOR PREPARING BENZENE CARBOXYLIC ACIDS

The present invention relates to a process for preparing benzene carboxylic acids, particularly to a process for oxidizing alkyl benzenes in liquid phase with molecular oxygen to benzene mono- or di-carboxylic acids.

Heretofore, various proposals have been made with reference to a process for oxidizing alkyl benzenes in liquid phase with molecular oxygen to thereby prepare benzene carboxylic acids.

Especially, in case of oxidizing dialkyl promoter oxidation of a first alkyl group proceeds with a metal catalyst such as, for instance, cobalt, manganese, chromium, nickel and lead, however, because oxidation of a second alkyl group is difficult with these metal catalysts only, in order to further oxidize the same to prepare benzene dicarboxylic acid, a process of using a promoter of a kind together with these metal catalysts has been proposed. For instance, there is a process of using a promoter such as peroxide, aldehyde, ketone and ether together with a metal catalyst such as cobalt, manganese and copper (U.S. Pat. No. 2,245,528), however, this process is not practical in respect of reaction rate and yield, especially oxidation of xylenes to benzene dicarboxylic acids cannot be carried out sufficiently by this process. As an improved process of this process, a process of carrying out oxidation under a specific reaction condition using as a catalyst cobalt compound and as a promoter an aliphatic aldehyde or a ketone having a methylene group is known. According to said improved process, oxidation of alkyl benzene to benzene dicarboxylic acid can be carried out in one stage. Besides, a process of using 2-butanol-cobalt catalyst system and a process of concurrently using a bromine compound and a heavy metal catalyst are known. Although each of these processes is an excellent process for oxidation in liquid phase with oxygen of alkyl benzenes, in respect of purity of the produced benzene carboxylic acid, it is hardly called a sufficiently satisfactory process. For instance, terephthalic acid obtained by oxidizing p-dialkyl benzene by the aforementioned process contains substances such as 4-carboxybenzaldehyde and p-toluic acid as impurities. Terephthalic acid is a very important substance as a material for preparing a polyester, however, in order to obtain terephthalic acid suitable therefor, there is a necessity of further purifying crude terephthalic acid obtained by the aforementioned process. Of impurities, aldehydes such as 4-carboxybenzaldehyde remarkably damage quality of a polymer in which respect their mixing is especially undesirable.

Also, a process of adding an oxidizing agent such as permanganate and bichromate into the reaction system during proceeding of an oxidation reaction due to a catalyst and promoter upon preparing terephthalic acid is known. However, because the added oxidizing agent consumes in the reaction system, such a process is not economical, further, quality of terephthalic acid obtained by said process cannnot be called sufficient.

Accordingly, an object of the present invention is to provide a process for economically preparing a high-purity benzene carboxylic acids whose aldehydes content is especially small by oxidizing alkyl benzenes in liquid phase with molecular oxygen.

Other objects of the present invention will become apparent from the following description.

These objects of the present invention are achieved by using concurrently (A) a cobalt compound and (B) a substance selected from the group consisting of metallic silver and a silver compound as catalysts, and using (C) a substance selected from the group consisting of aldehydes, ketones, alcohols and paraldehyde as a promoter together with these catalysts upon preparing a benzene carboxylic acid by oxidizing a benzene derivative having at least one side-chain alkyl group in a lower aliphatic carboxylic acid solvent with a molecular oxygen-containing gas.

The benzene derivative having at least one side-chain alkyl group used as the starting material in the present invention means besides an aromatic compound having as a substituent only a lower alkyl groups such as monoalkyl benzene, for instance, toluene or dialkyl benzene, for instance, p-xylene, m-xylene, o-xylene p-cymene, m-cymene and o-cymene; an aromatic compound having besides an alkyl group other substituents such as mono-lower alkyl benzaldehyde, for instance, tolualdehyde, or mono-lower alkyl benzoic acid, for instance, toluic acid.

The lower aliphatic carboxylic acid used as a solvent in the present invention means an aliphatic carboxylic acid having 2–5 carbon atoms and for instance, acetic acid and propionic acid are contained therein. The solvent most preferably used in the present invention is acetic acid.

Said starting material, benzene derivative is dissolved in these solvents at a concentration within the range of 1–60 percent by weight, preferably 5–60 percent by weight and offered for an oxidation reaction.

As catalysts, (A) a cobalt compound and (B) a silver compound or metallic silver are concurrently used. The using amount of the catalyst A is made an amount corresponding to 0.01–10 percent by weight as cobalt based on said solvent, while the using amount of the catalyst B is made an amount corresponding to at least one two-hundreths gram-atom as silver based on 1 gram-atom of cobalt. As the catalysts A and B, what is usable as a solution by said solvent, namely, what is dissoluble in said solvent under reaction conditions is preferable. As a cobalt compound and a silver compound of this kind, salts of an aliphatic carboxylic acid used as a solvent or salts of acids weaker than that, for instance, acetate and carbonate may be cited. It is undesirable from operational and economical reasons to use these dissoluble silver compounds in a large amount above 20 gram-atom of silver per 1 gram-atom of cobalt.

A cobalt compound, a silver compound and metallic silver relatively difficult to be dissolved in said solvent or insoluble therein may be used in the form of their dispersed solutions. Or else, these relatively hardly dissoluble or insoluble silver compounds or metallic silver may be settled inside a reactor in such a mode as the reaction mixture may sufficiently contact with these catalysts. For instance, it is possible to have metallic silver lined on the internal surface of the reactor functioned as a catalyst. Metallic silver is usable in the form of a simple substance of an alloy with other metal or metals.

The aldehydes, ketones, alcohols or paraldehyde as a promoter is each used in an amount within the range of 0.01–10 mols per 1 mol of said benzene derivative. The entire amount of such a promoter may be charged in the reaction system upon initiating the reaction or during process of the reaction it is divided into a certain amount and may be added to the reaction system by that amount at one time in a few times.

As aldehydes, an aliphatic aldehyde having 2–5 carbon atoms such as acetaldehyde, propionaldehyde and butylaldehyde is preferable, however, an aromatic aldehyde such as benzaldehyde is of course effective as well.

It is especially preferable that these aldehydes are used in an amount of above 0.1 mol, especially above 1 mol per 1 mol of said benzene derivative.

As ketones, what has 3–7 carbon atoms is preferable. For instance, methyl ethyl ketone, methyl propyl ketone, diethyl ketone, cyclohexanone and 2,4-pentanedione are contained therein. The most preferable using amount thereof is up to 5 mols per 1 mol of said benzene derivative.

As alcohols, what has 1–7 carbon atoms is preferable. As alcohols contained in these classes, methanol, ethanol, 2-propanol, 2-butanol, 2-pentanol and cyclohexanol are exemplified. It is most preferable to use these alcohols in an amount up to 5 mols per 1 mol of said benzene derivative.

Paraldehyde is a trimer of acetaldehyde obtained by acting sulfuric acid on acetaldehyde and is represented by the formula

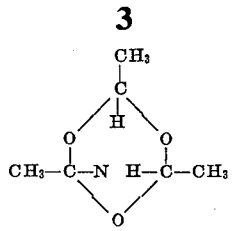

It is most preferable to use this paraldehyde in an amount up to 5 mols per 1 mol of said benzene derivation.

As an oxidizing agent, a molecular oxygen-containing gas, for instance, air or oxygen is used.

The reaction is carried out under a pressure of an oxygen partial pressure of 0.2–70 atmospheres at a temperature of 60°–200b$L$ C. In order to help dissolution of the catalysts, it is possible to add water to the reaction system. In that case, amount of water existing in the reaction system is held as up to 15 percent by weight based on the entire reaction mixture. When amount of water exceeds this limit, the reaction is obstructed.

As the reaction form, either batch system or continuous system may be adopted.

When a benzene derivative such as alkyl benzene is oxidized according to the process of the present invention as explained above, it is possible to obtain a high-purity benzene carboxylic acid, namely, having small content of impurities of aldehydes without sacrificing the reaction rate and yield as compared with the conventional process. Moreover, because once-used catalysts can be repeatedly used without requiring any special regeneration treatment, the process of the present invention is very economical.

As mentioned above, what is characteristic of the present invention consists in concurrent use of three, (A) a cobalt compound, and (B) metallic silver or a silver compound as catalysts and (C) aldehydes, ketones, alcohols or paraldehyde as a promoter. In case at least one of said three is omitted or replaced by another substance, the objects of the present invention cannot be achieved. For instance, in case a bromine compound well known as a promoter in a reaction of this kind is used instead of said promoter C in the present invention, or in case instead of said silver B, another metal compound is used, the result is either only a benzene carboxylic acid containing a considerable amount of impurities of aldehydes is produced or the reaction is remarkably obstructed.

Next, the present invention will be explained with reference to nonlimitative examples wherein parts represent parts by weight.

EXAMPLE 1

A mixture consisting of 2 g. of p-toluic acid, 0.5 g. of methyl ethyl ketone, 7.5 g. of acetic acid, 0.10 g. of cobalt acetate tetrahydrate and 0.07 g. of silver acetate was charged in a 100 cc. stainless steel shaking-type autoclave, into which oxygen was forced in until the gauge pressure became 20 kg./cm.$^2$, and the autoclave was shaken at 100° C. for 6 hours. After the reaction, a greater part of acetic acid was distilled off from the reaction mixture, the remaining reaction mixture was dissolved in an aqueous solution of sodium hydroxide, the precipitated catalysts were removed, thereafter to said solution hydrochloric acid was added, the precipitate was washed with water and dried to obtain 2.22 g. of the product.

The composition of said product was as follows and 4-carboxybenzaldehyde was not contained at all.

| | |
|---|---|
| Unreacted p-tolunic acid | 21.78% by weight |
| Terephthalic acid | 78.22% by weight |
| 4-Carboxybenzaldehyde | 0.00% by weight |

For the purpose of comparison, the similar oxidation was carried out using 0.20 g. of cobalt acetate tetrahydrate only instead of said cobalt acetate tetrahydrate and silver acetate to obtain 2.32 g. of the product, the composition of which was as follows.

| | |
|---|---|
| Unreacted p-toluic acid | 9.69% by weight |
| Terephthalic acid | 87.22% by weight |
| 4-Carboxybenzaldehyde | 3.09% by weight |

For the purpose of another comparison, the similar reaction was carried out using 0.5 g. of potassium bromide instead of said methyl ethyl ketone to obtain 2.20 g. of the product, the composition of which was as follows.

| | |
|---|---|
| Unreacted p-toluic acid | 15.47% by weight |
| Terephthalic acid | 77.45% by weight |
| 4-Carboxybenzaldehyde | 7.09% by weight |

For the purpose of still another operation, the similar oxidation were carried out using 0.10 g. of cobalt acetate tetrahydrate and metal compounds shown in table 1 instead of said cobalt acetate tetrahydrate and silver acetate. The results were shown in table 1. It is apparent from table 1 that these metal compounds remarkably obstruct the reaction or produce a large amount of 4-carboxybenzaldehyde as a byproduct.

TABLE 1

| Metal compound | Amount used (g.) | Amount of the product (g.) | Composition (percent by weight) | | |
|---|---|---|---|---|---|
| | | | Unreacted p-toluic acid | Terephthalic acid | 4-carboxybenzaldehyde |
| Mn(OAc)$_2$·4H$_2$O | 0.10 | 2.14 | 99.01 | | |
| Cu(OAc)$_2$·H$_2$O | 0.08 | 1.98 | 61.05 | 36.23 | 2.72 |
| Ni(OAc)$_2$·4H$_2$O | 0.10 | 2.09 | 15.88 | 81.23 | 2.89 |

EXAMPLE 2

A mixture consisting of 2 g. of p-xylene, 0.5 g. of methyl ethyl ketone, 15 cc. of acetic acid and 0.5 g. of cobalt acetate tetrahydrate was charged in a 100 cc. stainless steel shaking-type autoclave, into which oxygen was forced in until the gauge pressure became 40 kg./cm.$^2$, and said autoclave was shaken at 130° C. for 3 hours. After the reaction, precipitated terephthalic acid was separated by filtration, washed with heated acetic acid and dried. The yield was 2.12 g. and the conversion of p-xylene to terephthalic acid was 71 percent. Amount of 4-carboxybenzaldehyde contained in the so-obtained terephthalic acid was 0.00 percent by weight.

EXAMPLE 3

In example 2, using 0.5 g. of 2-butanol instead of said methyl ethyl ketone, the similar oxidation was carried out. The yield of terephthalic acid was 2.32 g. and its content of 4-carboxybenzaldehyde was 0.00 percent by weight.

For the purpose of comparison, using 0.7 g. of cobalt acetate tetrahydrate only instead of said cobalt acetate tetrahydrate and silver acetate, the similar oxidation was carried out. The yield of terephthalic acid was 2.35 g. and the so obtained terephthalic acid contained as much as 0.93 percent by weight of 4-carboxybenzaldehyde.

EXAMPLE 4

A mixture consisting of 10 parts of p-xylene, 10 parts of acetaldehyde, 2 parts of cobalt acetate tetrahydrate, 2 parts of silver carbonate and 100 parts of acetic acid was continuously fed into a reactor maintained at a temperature of 120° C. and under a gauge pressure of 15 kg./cm.$^2$ so as to make its average residence time inside the reactor 3 hours, said mixture being contacted with an oxygen-nitrogen mixed gas having an oxygen partial pressure of 8 kg./cm.$^2$ blown in from under the reactor. The reaction solution exhibited dark green and the reaction proceeded smoothly. The produced slurry-like reaction product containing terephthalic acid particles was continuously taken out from the reactor, solid particles were filtered off, washed with acetic acid and thereafter dried. The acid value of the so-obtained terephthalic acid was 674.2 mg. KOH/g. and its content of 4-carboxybenzaldehyde was 0.00 percent by weight.

For the purpose of comparison, using 3 parts of cobalt acetate tetrahydrate only instead of said cobalt acetate tetrahydrate and silver carbonate, the similar reaction was carried out. The acid value of the so-obtained terephthalic acid was 674.1 mg. KOH/g. and as much as 0.89 percent by weight of 4-carboxybenzaldehyde was contained therein.

EXAMPLE 5

Into a 1-liter flask equipped with a thermometer, a stirrer, a refluxing color and a gas inlet tube, 92 g. of toluene, 15 g. of diethyl ketone, 5 g. of cobalt carbonate hexahydrate, 5 g. of silver oxalate and 500 cc. of acetic acid were added. The flask was heated to 90° C. and oxygen was blown thereinto at a flow rate of 50 cc./min. with stirring. After the reaction was continued for 24 hours a greater part of the acetic acid was distilled off from the reaction mixture, the remaining reaction mixture was dissolved in an aqueous solution of sodium hydroxide, the precipitated catalysts were removed, thereafter, hydrochloric acid was added to the solution and by washing the precipitate with water and drying the same, 102 g. of benzoic acid was obtained. No aldehyde component was detected in said acid.

EXAMPLE 6

In example 5, using 53 g. of m-xylene instead of said toluene the similar oxidation was carried out to obtain 71 g. of isophthalic acid hardly containing any aldehyde component.

EXAMPLE 7

A mixture consisting of 2 g. of p-toluic acid, 0.5 g. of paraldehyde, 7.5 g. of acetic acid, 0.10 g. of cobalt acetate tetrahydrate and 0.07 g. of silver acetate was charged in a 100 cc. stainless steel shaking-type autoclave, into which oxygen was forced in until the gauge pressure became 20 kg./cm.$^2$ and the autoclave was shaken at 100° C. for 3 hours. After the reaction, a greater part of the acetic acid was distilled off from the reaction mixture, the remaining reaction mixture was dissolved in an aqueous solution of sodium hydroxide, the precipitated catalysts were removed, thereafter hydrochloric acid was added to the solution, the precipitate was washed with water and dried to thereby obtain 2.04 g. of the product. The composition of this product was as follows and 4-carboxybenzaldehyde was not contained therein at all.

| | |
|---|---|
| Unreacted p-toluic acid | 38.6% by weight |
| Terephthalic acid | 61.4% by weight |
| 4-Carboxybenzaldehyde | 0.00% by weight |

For the purpose of comparison, using 0.2 g. of cobalt acetate tetrahydrate only instead of said cobalt acetate tetrahydrate and silver acetate, the similar oxidation was carried out to obtain 2.28 g. of the product whose composition was as follows:

| | |
|---|---|
| Unreacted p-toluic acid | 28.6% by weight |
| Terephthalic acid | 68.8% by weight |
| 4-Carboxybenzaldehyde | 2.53% by weight |

For the purpose of another comparison, using 0.5 g. of potassium bromide instead of said paraldehyde, the similar oxidation was carried out to obtain 2.22 g. of the product whose composition was as follows.

| | |
|---|---|
| Unreacted p-toluic acid | 14.7% by weight |
| Terephthalic acid | 76.8% by weight |
| 4-Carboxybenzaldehyde | 8.51% by weight |

For the purpose of still another comparison, using 0.10 g. of cobalt acetate tettahydrate and metal compounds shown in table 2, the similar oxidations were carried out. The results are shown in table 2, from which it is apparent that these metal compounds remarkably obstruct the reaction or produce a large amount of 4-carboxybenzaldehyde as a byproduct.

TABLE 2

| Metal compound | Amount used (g.) | Amount of the product (g.) | Composition (percent by weight) | | |
|---|---|---|---|---|---|
| | | | Unreacted p-toluic acid | Terephthalic acid | 4-carboxy-benzaldehyde |
| Mn(OAc)$_2$·4H$_2$O | 0.10 | 1.80 | 98.5 | | |
| Cr(OAc)$_2$·H$_2$O | 0.10 | 1.82 | 68.4 | 29.2 | 2.44 |
| Pb(OAc)$_2$·3H$_2$O | 0.15 | 1.78 | 49.5 | 47.5 | 3.03 |
| Cu(OAc)$_2$·H$_2$O | 0.08 | 1.96 | 74.7 | 22.3 | 2.93 |

EXAMPLE 8

In example 7, instead of said silver acetate, various silver compounds shown in table 3 were used. The results were shown in table 3.

As will be apparent from comparison of the results shown in table 3 with controls in example 7 not using the silver compound described in example 7, use of a silver compound drastically inhibits production of 4-carboxybenzaldehyde.

TABLE 3

| Silver compound | Amount used (g.) | Amount of the product (g.) | Composition (percent by weight) | | |
|---|---|---|---|---|---|
| | | | Unreacted p-toluic acid | Terephthalic acid | 4-carboxy-benzaldehyde |
| Ag$_2$F | 0.05 | 1.96 | 39.24 | 60.65 | 0.11 |
| Ag$_2$SO$_4$ | 0.06 | 2.08 | 33.06 | 66.94 | 0.00 |
| C$_2$O$_4$Ag$_2$ | 0.06 | 2.08 | 29.94 | 70.06 | 0.00 |
| Ag$_2$CO$_3$ | 0.05 | 1.98 | 35.07 | 64.93 | 0.00 |
| Ag$_2$O* | 0.05 | 2.00 | 40.93 | 59.01 | 0.06 |
| AgNO$_3$* | 0.07 | 1.92 | 44.91 | 55.09 | 0.00 |
| AgCl | 0.06 | 2.02 | 17.74 | 80.76 | 1.50 |

*The autoclave was shaken for 6 hours.

EXAMPLE 9

A mixture consisting of 1.8 g. of p-xylene, 0.1 g. of paraldehyde, 15 g. of acetic acid, 0.60 g. of cobalt acetate tetrahydrate and 0.12 g. of silver acetate was charged in a 100 cc. stainless steel shaking-type autoclave, into which oxygen was forced in until the gauge pressure became 40 kg./cm.$^2$, and the autoclave was shaken at 120° C. for 3 hours. After the reaction, a greater part of the acetic acid was distilled off from the reaction mixture, the remaining reaction mixture was dissolved in an aqueous solution of sodium hydroxide, the precipitated catalysts were filtered off, thereafter, hydrochloric acid was added to the solution, the precipitate was washed with water and dried to thereby obtain 1.90 g. of the product, whose compositions was as follows.

| | |
|---|---|
| Unreacted p-toluic acid | 49.0% by weight |
| Terephthalic acid | 51.0% by weight |
| 4-Carboxybenzaldehyde | 0.01% by weight |

EXAMPLE 10

In example 9, using 1.8 g. of m-xylene instead of said p-xylene, the similar oxidation was carried out to obtain 0.92 g. of m-toluic acid and 0.83 g. of isophthalic acid and existence of aldehyde was hardly recognizable.

EXAMPLE 11

In example 9, 1.4 g. of toluene was used instead of said p-xylene to obtain 0.92 g. of benzoic acid and no aldehydes could be detected therein.

EXAMPLE 12

In example 9, using 2 g. of p-toluic acid, 0.4 g. of cobalt carbonate hexahydrate and 0.4 g. of silver oxalate instead of said p-xylene, cobalt acetate tetrahydrate and silver acetate, respectively, the similar oxidation was carried out to obtain 2.10 g. of the product, whose composition was as follows.

| | |
|---|---|
| Unreacted p-toluic acid | 42.1% by weight |
| Terephthalic acid | 57.9% by weight |
| 4-Carboxybenzaldehyde | 0.00% by weight |

EXAMPLE 13

A mixture consisting of 15 parts of p-xylene, 5 parts of paraldehyde, 0.5 part of cobalt acetate tetrahydrate, 0.5 part of silver acetate and 79 parts of acetic acid was continuously fed into a reactor maintained at a temperature of 130° C. and under a gauge pressure of 15 kg./cm.$^2$ so as to make its average residence time inside the reactor 3 hours, said mixture being contacted with an oxygen-nitrogen mixed gas having an oxygen partial pressure of 8 kg./cm.$^2$ blown in from under the reactor. The reaction solution exhibited dark green, amount of the paraldehyde existing therein being below 0.05 percent by weight and the reaction proceeded smoothly. The produced slurry-like reaction product containing terephthalic acid particles was continuously taken out from the reactor, solid particles were filtered off, washed with acetic acid and dried. The acid value of the so-obtained terephthalic acid was 675.2 mg. KOH/g. and content of 4-carboxybenzaldehyde contained therein was 0.00 percent by weight.

For the purpose of comparison, except using a mixture consisting of 15 parts of p-xylene, 5 parts of paraldehyde, 0.5 part of cobalt acetate tetrahydrate and 79.5 parts of acetic acid, the operations same as mentioned above were carried out. The reaction solution exhibited dark green, content of the paraldehyde existing therein being below 0.05 percent by weight and the reaction proceeded same as mentioned above. However, the acid value of the produced terephthalic acid was 674.1 mg. KOH/g. and 0.23 percent by weight of 4-carboxybenzaldehyde was contained therein.

EXAMPLES 14–17

Mixtures consisting of 2 g. of p-toluic acid, 0.5 g. of paraldehyde, 7.5 g. of acetic acid, 0.2 g. of cobalt acetate tetrahydrate and silver powder in amounts shown in table 4 were charged in a 100 cc. stainless steel shaking-type autoclave, into which oxygen was forced in until the gauge pressure became 20 kg./cm.$^2$, and the autoclave was shaken at 100° C. for 3 hours. After the reactions, a greater part of the acetic acid was distilled off from the reaction mixtures, the remaining reaction mixtures were dissolved in an aqueous solution of sodium hydroxide, the precipitated catalysts were removed, thereafter hydrochloric acid was added to the solutions, the precipitates were washed with water and dried, the yields and compositions of the so-obtained products being as shown in table 4.

TABLE 4

| Example | Amount of silver powder (g.) | Yield of the product (g.) | Composition (percent by weight) | | |
|---|---|---|---|---|---|
| | | | Unreacted p-toluic acid | Terephthalic acid | 4-carboxybenzaldehyde |
| 14 | 2.0 | 2.02 | 44.3 | 55.7 | 0.00 |
| 15 | 1.0 | 2.05 | 31.6 | 68.4 | 0.00 |
| 16 | 0.10 | 2.01 | 28.4 | 71.6 | 0.00 |
| 17 | 0.0043 | 2.14 | 21.2 | 78.8 | 0.00 |

For the purpose of comparison, by carrying out the operations same as mentioned above without using the silver powder, 2.11 g. of the product was obtained, whose composition was as follows and existence of 4-carboxybenzaldehyde was recognized.

| | |
|---|---|
| Unreacted p-toluic acid | 2.20% by weight |
| Terephthalic acid | 74.5% by weight |
| 4-Carboxybenzaldehyde | 3.20% by weight |

EXAMPLE 18

In a 100 cc. stainless steel shaking-type autoclave, 2 g. of p-xylene, 0.5 g. paraldehyde, 7.5 g. of acetic acid, 0.1 g. of cobalt acetate tetrahydrate and 1.0 g. of silver powder were charged, into which oxygen was blown in until the gauge pressure became 20 kg./cm.$^2$, the autoclave was heated to 120° C. and shaken. After 2 hours, 0.5 g. of paraldehyde was further added thereto and the reaction was continued for further 2 hours. After the reaction, a greater part of the acetic acid was distilled off from the reaction mixture, the remaining reaction mixture was dissolved in an aqueous solution of sodium hydroxide, the precipitated catalysts were filtered off, thereafter hydrochloric acid was added to the solution, the precipitate was washed with water and dried to thereby obtain 2.40 g. of the product, whose composition was as follows and existence of 4-carboxybenzaldehyde was not recognizable.

| | |
|---|---|
| Unreacted p-toluic acid | 52.4% by weight |
| Terephthalic acid | 4.76% by weight |
| 4-Carboxybenzaldehyde | 0.00% by weight |

EXAMPLES 19–20

In examples 14–17, instead of said paraldehyde, 0.5 g. of promoters shown in table 5 were used. The results were shown in table 5.

TABLE 5

| Example | Promoter | Yield of the product (g.) | Composition (percent by weight) | | |
|---|---|---|---|---|---|
| | | | Unreacted p-toluic acid | Terephthalic acid | 4-carboxybenzaldehyde |
| 19 | Methyl ethyl ketone. | 2.10 | 48.5 | 51.5 | 0.00 |
| 20 | 2-butanol | 2.01 | 58.2 | 41.8 | 0.00 |

EXAMPLE 21

A mixture consisting of 5 parts of p-xylene, 5 parts of acetaldehyde, 1 part of cobalt acetate tetrahydrate and 100 parts of acetic acid having been contacted with silver powder at 100° C. for 2 hours in advance, was continuously fed into a reactor maintained at a temperature of 110° C. and under a gauge pressure of 15 kg./cm.$^2$ so as to make its average residence time inside the reactor 4 hours, said mixture being contacted with an oxygen-nitrogen mixed gas having an oxygen partial pressure of 8 kg./cm.$^2$ blown in from under the reactor. The produced slurry-like reaction product containing terephthalic acid particles was continuously taken out from the reactor, solid particles were filtered off, washed with acetic acid and dried. The acid value of the so-obtained terephthalic acid was 673.5 mg. KOH/g. and its content of 4-carboxybenzaldehyde was 0.05 percent by weight.

For the purpose of comparison, when acetic acid not having been contacted with silver powder in advance was used, the result was that the product contained 0.52 percent by weight of 4-carboxybenzaldehyde.

EXAMPLE 22

A mixture consisting of 92 g. of toluene, 15 g. of diethyl ketone, 5 g. of cobalt carbonate hexahydrate and 500 cc. of acetic acid was charged in a 1-liter flask with a thermometer, a stirrer, a refluxing cooler and a gas inlet tube, in which 30 g. of silver foil was immersed. The flask was heated to 90° C. and into said mixed solution oxygen was blown in at a flow rate of 50 cc./min. After the reaction was continued for 24 hours, a greater part of the acetic acid was distilled off from the reaction mixture. The remaining reaction mixture was dissolved in an aqueous solution of sodium hydroxide, the precipitated catalysts were removed, thereafter hydrochloric acid was added to the solution, the precipitate was washed with water and dried to thereby obtain 98 g. of benzoic acid, in which product no aldehyde component could be deleted.

EXAMPLE 23

In example 18, instead of p-xylene, 2 g. of m-xylene was used and instead of silver powder, 3.0 g. of granular silver was used to obtain 1.50 g. of the product, whose composition was as follows.

| | |
|---|---|
| m-Toluic acid | 70.2% by weight |
| Isophthalic acid | 29.7% by weight |
| Aldehyde component | 0.05% by weight |

What is claimed is:

1. In a process for preparing a benzene carboxylic acid by oxidizing a benzene derivative having at least one alkyl group side chain with a molecular oxygen-containing gas in a lower aliphatic carboxylic acid solvent under an oxygen partial pressure of 0.2-70 atmospheres and at a temperature of 60°-200° C., the improvement which comprises employing (A) a cobalt compound in an amount of 0.01-10 percent by weight of cobalt based on said solvent, (B) a catalyst selected from the group consisting of metallic silver and a silver compound in amount corresponding to one two-hundredth gram-atoms of silver per 1 gram-atom of cobalt and (C) a promoter selected from the group consisting of aliphatic aldehydes having 2-5 carbon atoms, benzaldehyde, ketones having 3-7 carbon atoms, alcohols having 1-7 carbon atoms and paraldehyde in an amount of 0.01-10 moles per mole of benzene derivative.

2. The process of claim 1 wherein said lower aliphatic carboxylic acid solvent is used in an amount sufficient to dissolve said benzene derivative having at least one side-chain alkyl group at a concentration of 1-60 percent by weight.

3. The process of claim 1 wherein said cobalt compound and silver compound are dissoluble in said lower aliphatic carboxylic acid solvent under the reaction conditions.

4. The process of claim 3 wherein said cobalt compound and silver compound are salts of said lower aliphatic carboxylic acid used as a solvent.

5. The process of claim 3 wherein said cobalt compound and silver compound are salts of an acid weaker than said lower aliphatic carboxylic acid solvent.

6. In a process for preparing an aromatic carboxylic acid selected from the group consisting of benzene monocarboxylic acids and benzene dicarboxylic acids by oxidizing an aromatic compound having at least one alkyl group side chain selected from the group consisting of monoalkyl benzenes, dialkyl benzenes, monoalkyl benzaldehydes, and monoalkyl benzoic acids, with a molecular oxygen containing gas in a lower aliphatic acid solvent under an oxygen partial pressure of 0.2-70 atmospheres and at a temperature of 60°-200° C., the improvement which comprises employing (A) a cobalt compound in an amount of 0.01-10 percent by weight of cobalt based on said solvent, (B) a catalyst selected from the group consisting of metallic silver and a silver compound in an amount corresponding to at least one two-hundredth gram-atoms of silver per gram-atom of cobalt and (C) a promoter selected from the group consisting of aliphatic aldehydes having 2-5 carbon atoms, benzaldehyde ketones having 3-7 carbon atoms, alcohols, having 1-7 carbon atoms and paraldehyde in an amount of 0.01-10 moles per mole of aromatic compound, said aromatic compound being present in an amount of 1-60 percent by weight based on the solvent.

* * * * *